United States Patent
Chen et al.

(10) Patent No.: US 8,170,964 B2
(45) Date of Patent: May 1, 2012

(54) METHOD FOR PLANNING A SEMICONDUCTOR MANUFACTURING PROCESS BASED ON USERS' DEMANDS USING A FUZZY SYSTEM AND A GENETIC ALGORITHM MODEL

(75) Inventors: Wei Jun Chen, Taichung County (TW); Chun Chi Chen, Taipei (TW); Yun-Zong Tian, Taichung County (TW); Yi Feng Lee, Taipei County (TW); Tsung-Wei Lin, Taoyuan County (TW)

(73) Assignee: Inotera Memories, Inc., Taoyuan County (TW)

( * ) Notice: Subject to any disclaimer, the term of this patent is extended or adjusted under 35 U.S.C. 154(b) by 571 days.

(21) Appl. No.: 12/471,711

(22) Filed: May 26, 2009

(65) Prior Publication Data
US 2010/0205127 A1 Aug. 12, 2010

(30) Foreign Application Priority Data
Feb. 11, 2009 (TW) .............................. 98104297 A

(51) Int. Cl.
*G07B 15/00* (2011.01)
(52) U.S. Cl. ....................................................... 706/13
(58) Field of Classification Search .................. 706/1–9, 706/52, 45, 12–13
See application file for complete search history.

(56) References Cited

U.S. PATENT DOCUMENTS
| | | | |
|---|---|---|---|
| 6,853,991 B1* | 2/2005 | Kermani | 706/52 |
| 2005/0119986 A1* | 6/2005 | Panfilov et al. | 706/59 |
| 2011/0131162 A1* | 6/2011 | Kaushal et al. | 706/13 |

* cited by examiner

*Primary Examiner* — David Vincent
(74) *Attorney, Agent, or Firm* — Rosenberg, Klein & Lee

(57) ABSTRACT

A method for planning a semiconductor manufacturing process based on users' demands includes the steps of: establishing a genetic algorithm model and inputting data; establishing a fuzzy system and setting one output parameter representing percent difference of each cost function in neighbor generations; setting to have a modulation parameter corresponding to each input parameter for adjusting fuzzy sets of the output parameter; executing genetic algorithm actions; executing fuzzy inference actions; eliminating chromosomes that produce output parameter smaller than a defined lower limit, and the remaining chromosomes that produces the largest output parameter is defined as the optimum chromosome, wherein the genetic algorithm actions stops being executed upon the optimum chromosome; then determining whether or not a defined number of generations has been reached, if yes, executing the optimum chromosome of the last generation; if no, continuing executing the genetic algorithm actions, thereby finding the optimum semiconductor manufacturing process for users.

18 Claims, 4 Drawing Sheets

METHOD FOR PLANNING A SEMICONDUCTOR MANUFACTURING PROCESS BASED ON USERS' DEMANDS USING A FUZZY SYSTEM AND A GENETIC ALGORITHM MODEL

BACKGROUND OF THE INVENTION

1. Field of the Invention

The present invention relates to a method for planning a manufacturing process, and more particularly to a method for planning a semiconductor manufacturing process based on users' demands.

2. Description of Related Art

As shown in FIG. 1, a conventional method for planning a semiconductor manufacturing process includes the steps of:

Step S10: establishing a genetic algorithm model and inputting data into the genetic algorithm model, wherein the data represents the manufacturing type of each wafers that is within a group of wafer lot that is to be manufactured;

Step S20: executing genetic algorithm actions which include coding, crossover, reproduction, mutating, decoding, and so on;

Step S30: determining whether or not a defined number of the generations of the genetic algorithm model has been reached, if yes, executing the step S40; if no, jumping back to the step S20; and Step S40: defining the chromosome in the genetic algorithm model, which has the smallest value of a fitness function, to be the optimum chromosome, and selecting the optimum chromosome of the generation to be the basis for planning the manufacturing process, wherein the optimum chromosome represents the manufacturing type of each wafer, the manufacturing order of each wafer, and the manufacturing allocated tool of each wafer.

However, the conventional method for planning a semiconductor manufacturing process has the following shortcomings: when users must consider a plurality of performance indexes, the fitness function of the genetic algorithm model is formed by adding a plurality of cost functions multiplied by their own weight, and each cost function respectively represents a kind of performance index and it is very difficult to define the weight of each cost function. If the definition of the weight of any cost function is not accurate, then the result would not meet users' demands, and furthermore, each user has his different demands and it must change the weights when the users' demands are different, which is very inconvenient.

Hence, the inventors of the present invention believe that the shortcomings described above are able to be improved and finally suggest the present invention which is of a reasonable design and is an effective improvement based on extensive research and thought.

SUMMARY OF THE INVENTION

An object of the present invention is to provide a method for planning a semiconductor manufacturing process based on users' demands which can provide the optimum manufacturing process for users according to users' different demands.

To achieve the above-mentioned object, a method for planning a semiconductor manufacturing process based on users' demands in accordance with the present invention is provided. The method includes the steps of: establishing a genetic algorithm model and inputting data, wherein a fitness function of the genetic algorithm model is formed by adding a plurality of cost functions. Then, setting each cost function to have the same weight, defining the number of genetic evolution generations and, defining the number of chromosomes generated by each generation; establishing a fuzzy system which has a plurality of input parameters and one output parameter, the output parameter representing percent difference of each cost function in neighbor generations; setting to have a modulation parameter corresponding to each input parameter for adjusting fuzzy sets of the output parameter; executing genetic algorithm actions; executing fuzzing actions, fuzzy inference actions, and defuzzing actions; eliminating the chromosomes that produce output parameter smaller than a defined lower limit, and the remaining chromosomes that produce the largest output parameter is defined as the optimum chromosome, wherein the genetic algorithm actions stops being executed upon the optimum chromosome; and determining whether or not the defined number of the generations has been reached, if yes, selecting the optimum chromosomes of the last generation; if no, continuing executing the genetic algorithm actions.

The efficacy of the present invention is as follows: users can define the modulation parameters according to their recognition degrees on various process performance indexes so as to adjust the fuzzy sets of the output parameter, so the output parameter of the fuzzy system become another basis for adjusting the optimum chromosome of the genetic algorithm model, thereby not only can the optimum chromosome be the basis for improving the process performance of semiconductors, but also be suitable for users.

DETAILED DESCRIPTION OF THE PREFERRED EMBODIMENTS

Figure 1:
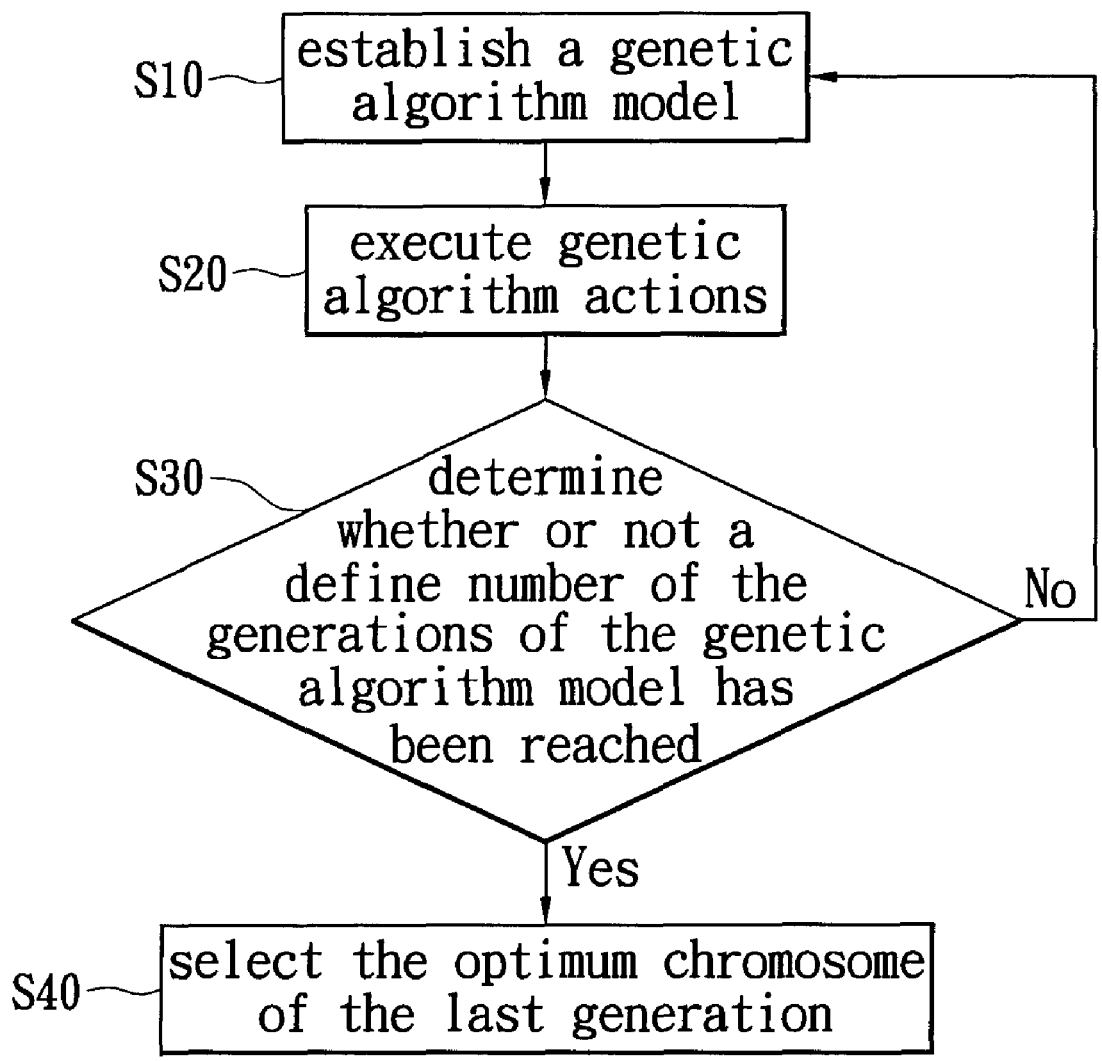
FIG. 1 is a flow chart of a conventional method for planning a semiconductor manufacturing process.
Figure 2:
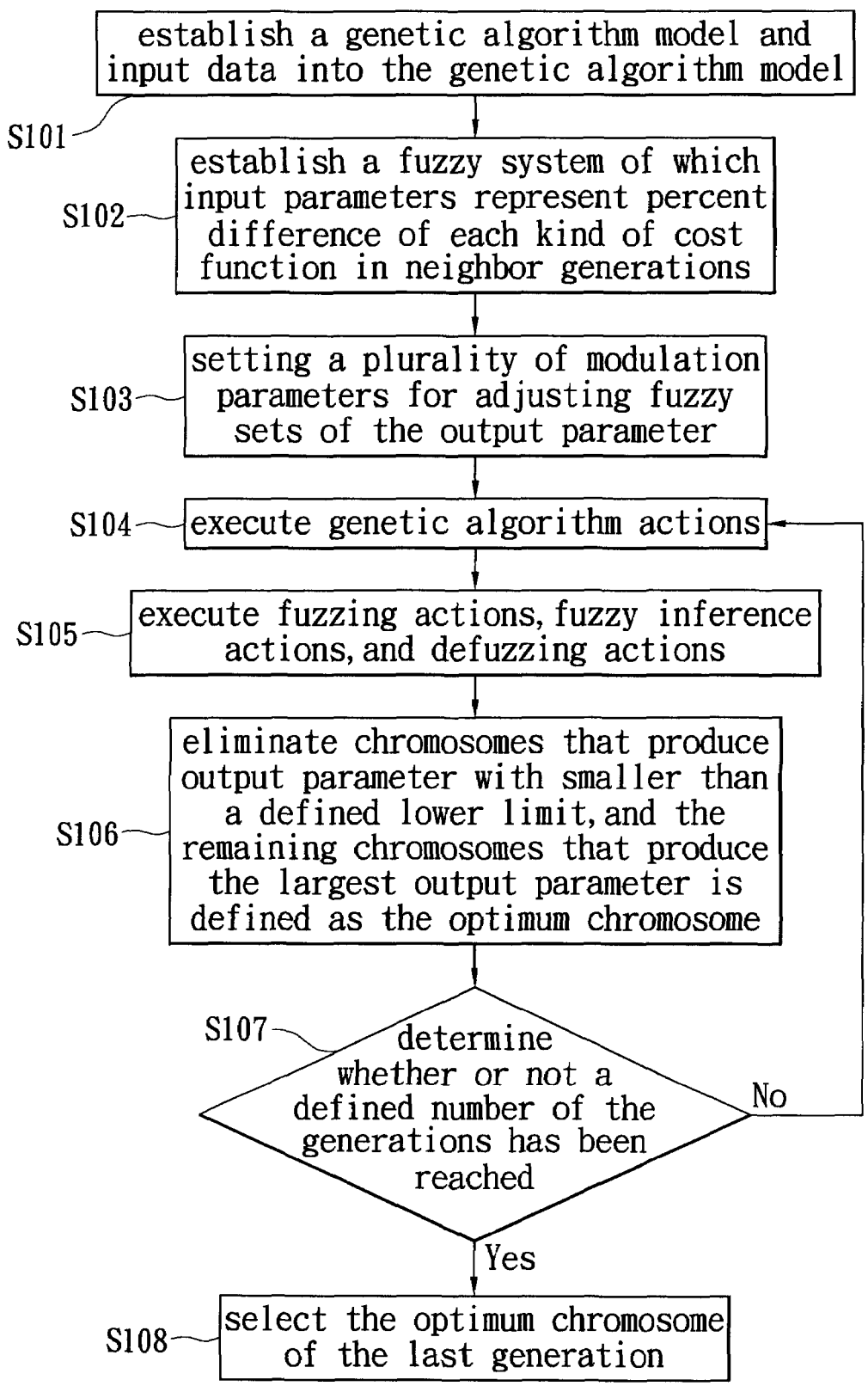
FIG. 2 is a flow chart of a method for planning a semiconductor manufacturing process based on users' demands of the present invention.

As shown in FIG. 2, the present invention provides a method for planning a semiconductor manufacturing process based on users' demands, which can be applied in a lithography process for semiconductors. The method includes steps S101-S108.

In the step S101, establish a genetic algorithm model. Predefine capable tools for each lithography layer, also predefine the process time required for each tool to manufacture each wafer of each lithography layer, and predefine setup time required for each tool to execute reticle change between each lithography layer; input data into the genetic algorithm model, wherein the data represents a group of wafer lots which need to be manufactured; and predefine the number of the wafers of each wafer lot and the type of the lithography layer of each wafer lot.

A fitness function of the genetic algorithm model is formed by adding three cost functions. The weight of each cost function is set to be the same and the number of the genetic evolution generations and the number of the chromosomes generated by each generation are defined.

Each cost function represents a kind of process performance index of semiconductors. The smaller value the cost function has, the better the corresponding performance index represents. The performance indexes of the preferred embodiment include lot priority, reticle change frequency and process completion time.

Figure 3:
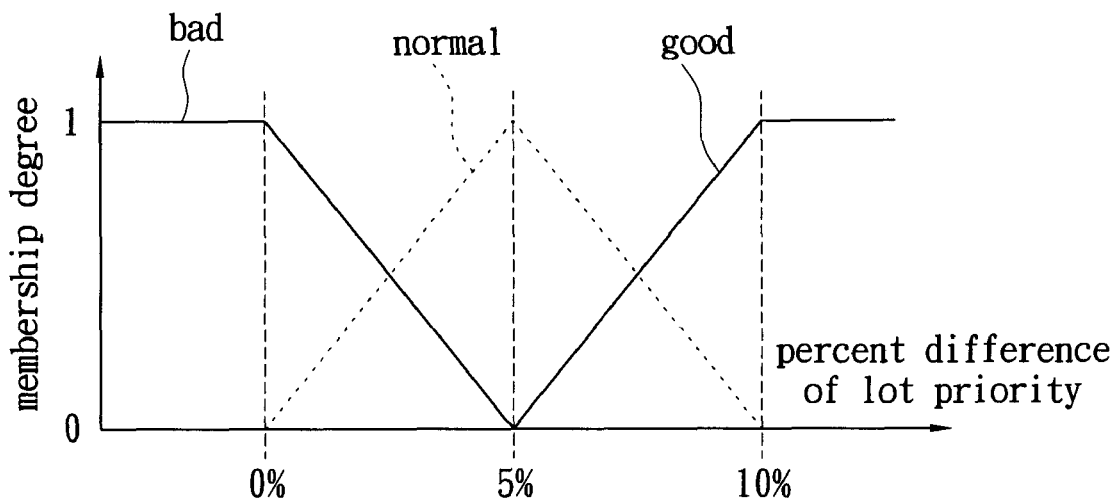
FIG. 3 is a view of a fuzzy set antecedent of a fuzzy system of the present invention.
Figure 4:
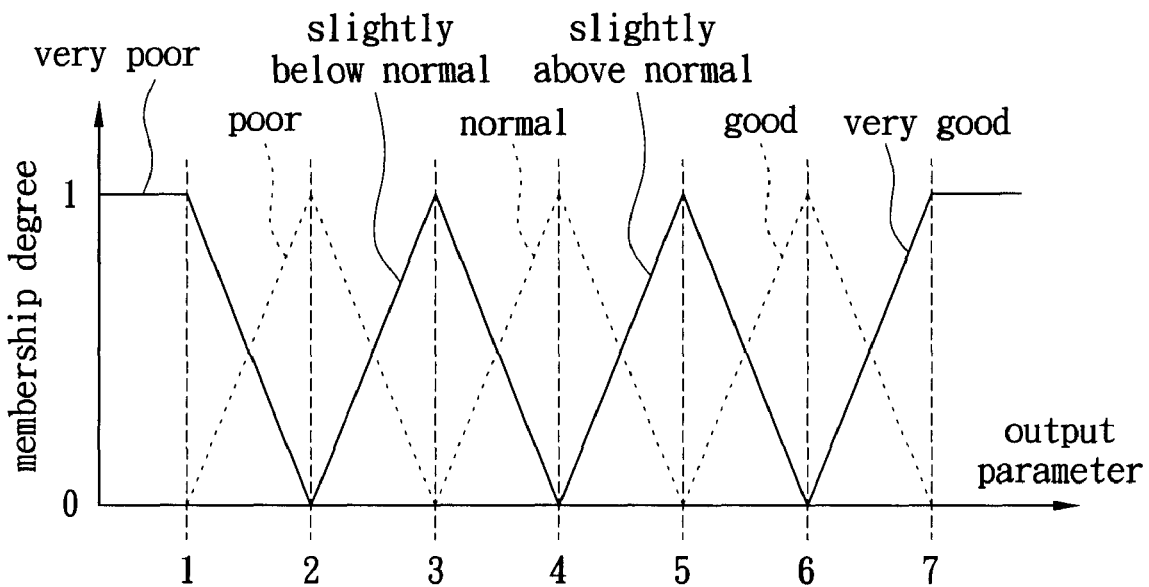
FIG. 4 is a view of a fuzzy set consequence of the fuzzy system of the present invention.

In the step S102, establish a fuzzy system. The fuzzy system defines three input parameters and one output parameter, wherein the input parameters respectively represent percent difference of each kind of cost function in neighbor generations, in other words the input parameter represents the improvement level of each kind of cost function after one generation. As shown in FIG. 3 and FIG. 4, each input parameter corresponds to three fuzzy sets antecedent (bad, normal, and good), and the output parameter corresponds to seven fuzzy sets consequence (very poor, poor, slightly below normal, normal, slightly above normal, good and very good).

In the step S103, define a modulation parameter corresponding to each cost function. These modulation parameters are used to adjust the fuzzy sets of the output parameter: the larger the modulation parameters are set to be, the larger the adjusted ranges of the fuzzy sets consequence are. In the embodiment, users pay the most attention to the process performance index of the reticle change frequency, then the process performance index of the process completion time, and finally the process performance index of the lot priority, so the order that users set the modulation parameters from the larger to the smaller is the process performance index of the reticle change frequency, the process performance index of the process completion time, and the process performance index of the lot priority.

In the step S104, start to execute genetic algorithm actions which include coding, crossover, reproduction, mutating, decoding and so on.

In the step S105, the fuzzy system fuzzes up the three input parameters firstly and find the corresponding fuzzy sets (bad, normal or good), and then execute fuzzy inference actions to generate the fuzzy sets of the output parameter according to fuzzy rules of the fuzzy system, and finally defuzzes the fuzzy sets of the output parameter to get the specific value of the output parameter. The defuzzing action may be executed via the centroid method, the mean of maxima method or the weighted average method.

Figure 5:
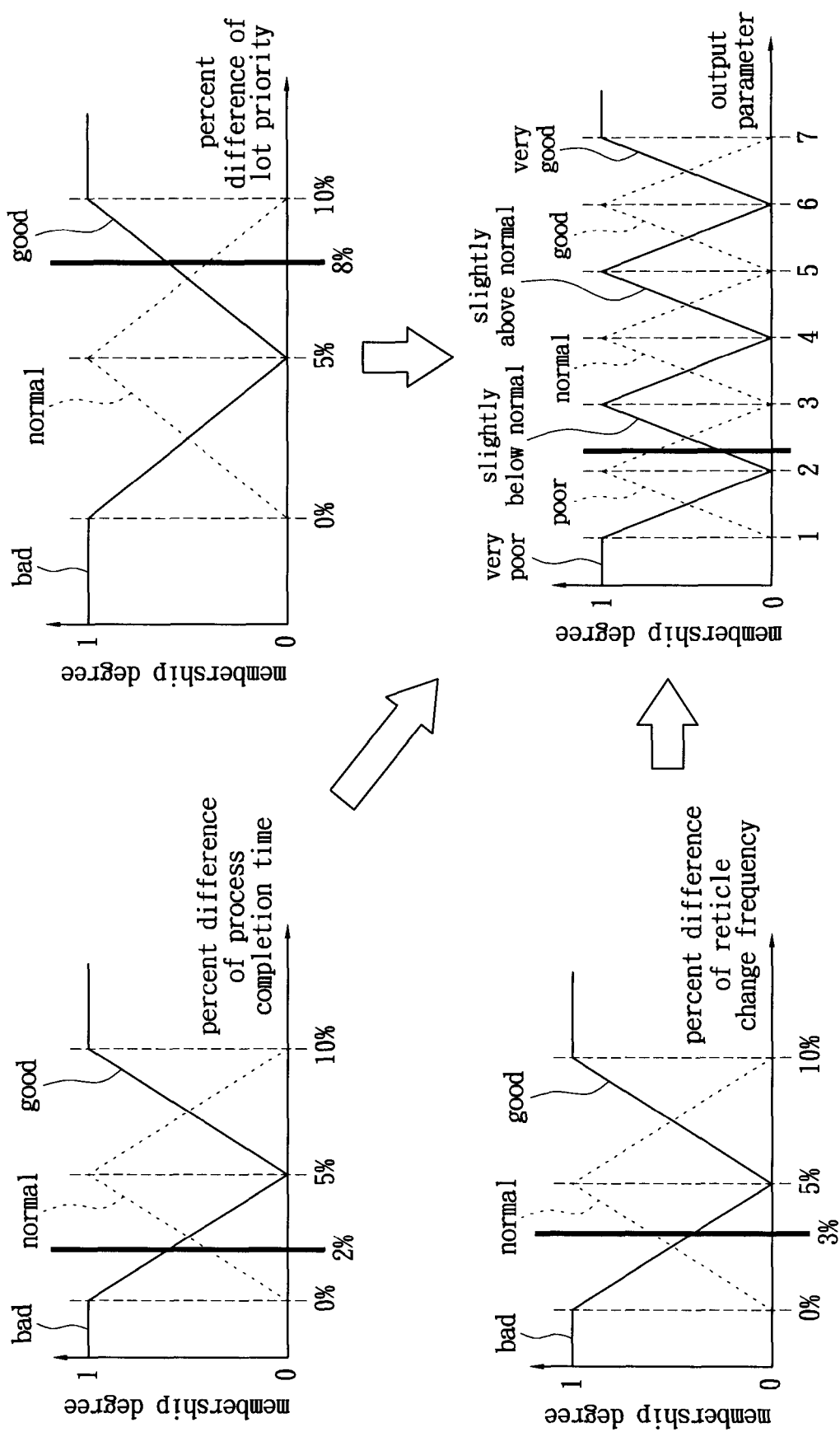
FIG. 5 is a schematic view showing fuzzy inference actions and defuzzing actions of the fuzzy system of the present invention.

As shown in FIG. 5, when the input parameters of the fuzzy system are respectively 8%, 3%, and 2% (thick black-lines), the fuzzy system executes the fuzzy inference actions according to the eight fuzzy rules as follows:

IF $x1$=good, and $x2$=normal, and $x3$=bad, then $y$=slightly below normal;
IF $x1$=good, and $x2$=normal, and $x3$=normal, then $y$=slightly above normal;
IF $x1$=good, and $x2$=bad, and $x3$=normal, then $y$=poor;
IF $x1$=good, and $x2$=bad, and $x3$=bad, then $y$=very poor;
IF $x1$=normal, and $x2$=normal, and $x3$=normal, then $y$=normal;
IF $x1$=normal, and $x2$=normal, and $x3$=bad, then $y$=poor;
IF $x1$=normal, and $x2$=bad, and $x3$=normal, then $y$=very poor; and
IF $x1$=normal, and $x2$=bad, and $x3$=bad, then $y$=very poor;
Wherein $x1$, $x2$, and $x3$ respectively represent the improvement levels of the lot priority, the reticle change frequency, and the process completion time, y is the output parameter which represents the levels that the chromosomes meet users' demands. After the fuzzy inference actions are executed based on the eight fuzzy rules and the defuzzing actions are executed, the resultant output parameter is 2.35 (thick black-lines).

The reason that the modulation parameter can adjust the fuzzy sets consequence of the fuzzy system will be simply described in the following Table 1 and Table 2 listed in the embodiment:

TABLE 1

Improvement level of lot priority

| Improvement level of reticle change frequency | Improvement level of process completion time | Bad | Normal | Good |
|---|---|---|---|---|
| Bad | Bad | −2 | −1 | 0 |
| | Normal | 0 | 1 | 2 |
| | Good | 2 | 3 | 4 |
| Normal | Bad | 1 | 2 | 3 |
| | Normal | 3 | 4 | 5 |
| | Good | 5 | 6 | 7 |
| Good | Bad | 4 | 5 | 6 |
| | Normal | 6 | 7 | 8 |
| | Good | 8 | 9 | 10 |

TABLE 2

| Scores in Table 1 | Fuzzy sets consequence |
|---|---|
| ≦1 | Very poor |
| 2 | Poor |
| 3 | Slightly below normal |
| 4 | Normal |
| 5 | Slightly above normal |
| 6 | Good |
| ≧7 | Very good |

In Table 1, the three input parameters are respectively the improvement levels of the lot priority, the reticle change frequency, and the process completion time. Since each input parameter is defined to correspond to three fuzzy sets antecedent, the fuzzy rules of the fuzzy system in total have 27 kinds of possibilities. During the fuzzy inference actions, each fuzzy rule corresponds to one score in Table 1 and each fuzzy set consequence corresponds to one score range (Table 2). For example, when the fuzzy sets antecedent of the three input parameters are all normal, the score in Table 1 is 4, and 4 corresponds to "normal" of the fuzzy set antecedent in Table 2.

In Table 1, the modulation parameters set for the improvement levels of the reticle change frequency, the process completion time, and the lot priority are respectively 3, 2, and 1. When the fuzzy set for the improvement level of the reticle change frequency changes, the influence on the scores in Table 1 is the greatest, and the larger the score changes, the more the chance for changing of the fuzzy sets consequence is, which corresponds to the rule that users pay the most attention to the improvement level of the reticle change frequency.

In the step S106, eliminate each chromosome of each generation that produces output parameter of the fuzzy system smaller than a defined lower limit, and the remaining chromosome that has the largest output parameter is defined as the optimum chromosome, wherein the genetic algorithm actions stops being executed upon the optimum chromosome. If there are more than two chromosomes that produce the largest output parameter, then further compare the values of the fitness function, wherein each chromosome that produces the fitness function with the smallest value is set to be the optimum chromosome.

In the step S107, determine whether or not the defined number of the generations has been reached, if yes, execute the step S108, if no, jump back to the step S104.

In the step S108, select the optimum chromosome of the last generation which represents the manufacturing type of the lithography layer of each wafer lot, the manufacturing allocated tool of each wafer lot, and the manufacturing order of each wafer lot, which may be the basis for users planning the semiconductor manufacturing process.

A method for planning a semiconductor manufacturing process based on users' demands of the present invention ensures that users can define the modulation parameters according to their recognition degrees on various process performance indexes so as to adjust the fuzzy sets of the output parameter, so that the output parameter of the fuzzy system become another basis for adjusting the optimum chromosomes of the genetic algorithm model, thereby not only can the optimum chromosome be the basis for improving the process performance of semiconductors, but also be suitable for users.

What are disclosed above are only the specification and the drawings of the preferred embodiment of the present invention and it is therefore not intended that the present invention be limited to the particular embodiment disclosed. It will be understood by those skilled in the art that various equivalent changes may be made depending on the specification and the drawings of the present invention without departing from the scope of the present invention.

What is claimed is:

1. A method for planning a semiconductor manufacturing process based on users' demands, comprising the steps of:
    establishing a genetic algorithm model and inputting data, wherein a fitness function of the genetic algorithm model is formed by adding a plurality of cost functions, setting each cost function to have the same weight, defining the number of genetic evolution generations, and defining the number of chromosomes generated by each generation;
    establishing a fuzzy system which has a plurality of input parameters and one output parameter, the output parameter representing percent difference of each cost function in neighbor generations;
    setting to have a modulation parameter corresponding to each input parameter for adjusting fuzzy sets of the output parameter;
    executing genetic algorithm actions;
    executing fuzzing actions, fuzzy inference actions, and defuzzing actions;
    eliminating the chromosomes that produces output parameter smaller than a defined lower limit, and defining the remaining chromosome that produce the largest output parameter as the optimum chromosome, wherein the genetic algorithm actions stops being executed upon the optimum chromosome; and
    determining whether or not the number of the defined number of the generations has been reached, if yes, executing the optimum chromosome of the last generation; if no, continuing executing the genetic algorithm actions.

2. The method as claimed in claim 1, wherein if there are more than two chromosomes that produce the largest output parameter, then further compare the values of the fitness function, wherein each chromosome that produces the fitness function with the smallest value is set as the optimum chromosome.

3. The method as claimed in claim 1, wherein the larger the modulation parameters are set to be, the larger the adjusted ranges of the fuzzy sets of the output parameter are.

4. The method as claimed in claim 1, wherein the fuzzy system is set to have three input parameters.

5. The method as claimed in claim 1, wherein each input parameter is set to correspond to three fuzzy sets, and the output parameter is set to correspond to seven fuzzy sets.

6. The method as claimed in claim 1, wherein a fuzzy rule of the fuzzy system is IF-THEN-type.

7. The method as claimed in claim 1, wherein the defuzzing actions are executed via a centroid method.

8. The method as claimed in claim 1, wherein the defuzzing actions are executed via a mean of maxima method.

9. The method as claimed in claim 1, wherein the defuzzing actions are executed via a weighted average method.

10. A method for planning a semiconductor manufacturing process based on users' demands, which is applied in a lithography process, comprising the steps of:
    establishing a genetic algorithm model and inputting data, wherein a fitness function of the genetic algorithm model is formed by adding a plurality of cost functions, setting each cost function to have the same weight, defining the number of genetic evolution generations, and defining the number of chromosomes generated by each generation;
    establishing a fuzzy system which has a plurality of input parameters and one output parameter, the output parameter representing percent difference of each cost function in neighbor generations;
    setting to have a modulation parameter corresponding to each input parameter for adjusting fuzzy sets of the output parameter;
    executing genetic algorithm actions;
    executing fuzzing actions, fuzzy inference actions and defuzzing actions;
    eliminating the chromosomes that produces output parameter smaller than a defined lower limit, and defining the remaining chromosome that produce the largest output parameter as the optimum chromosome, wherein the genetic algorithm actions stops being executed upon the optimum chromosome; and
    determining whether or not the number of the defined number of the generations has been reached, if yes, executing the optimum chromosomes of the last generation; if no, continuing executing the genetic algorithm actions.

11. The method as claimed in claim 10, wherein if there are more than two chromosomes that produce the largest output parameter, then further compare the values of the fitness function, wherein each chromosome that produces the fitness function with the smallest value is set as the optimum chromosome.

12. The method as claimed in claim 10, wherein the larger the modulation parameters are set to be, the larger the adjusted ranges of the fuzzy sets of the output parameter are.

13. The method as claimed in claim 10, wherein the fuzzy system is set to have three input parameters.

14. The method as claimed in claim 10, wherein each input parameter is set to correspond to three fuzzy sets, and the output parameter is set to correspond to seven fuzzy sets.

15. The method as claimed in claim 10, wherein a fuzzy rule of the fuzzy system is IF-THEN-type.

16. The method as claimed in claim 10, wherein the defuzzing actions are executed via a centroid method.

17. The method as claimed in claim 10, wherein the defuzzing actions are executed via a mean of maxima method.

18. The method as claimed in claim 10, wherein the defuzzing actions are executed via a weighted average method.

* * * * *